(12) United States Patent
Furukawa et al.

(10) Patent No.: US 7,371,176 B2
(45) Date of Patent: May 13, 2008

(54) GAME CONTROLLER WITH VIBRATION MOTOR

(75) Inventors: Hitoshi Furukawa, Tokyo (JP); Hiroshi Ishimaru, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 799 days.

(21) Appl. No.: 10/271,978

(22) Filed: Oct. 17, 2002

(65) Prior Publication Data

US 2003/0083129 A1    May 1, 2003

(30) Foreign Application Priority Data

Oct. 26, 2001    (JP)    ............................ P2001-329286

(51) Int. Cl.
*A63F 13/00*    (2006.01)
(52) U.S. Cl. ...................................... 463/37
(58) Field of Classification Search ............ 463/36–38; D14/402–410; 345/163
See application file for complete search history.

(56) References Cited

U.S. PATENT DOCUMENTS

| | | | | |
|---|---|---|---|---|
| 4,474,418 A | * | 10/1984 | Yamada | ...................... 439/374 |
| 5,624,117 A | * | 4/1997 | Ohkubo et al. | ......... 273/148 B |
| 5,691,898 A | * | 11/1997 | Rosenberg et al. | ........... 700/85 |
| 5,716,274 A | * | 2/1998 | Goto et al. | .................... 463/37 |
| 5,984,785 A | * | 11/1999 | Takeda et al. | ................ 463/38 |
| 6,171,191 B1 | * | 1/2001 | Ogata et al. | .................. 463/38 |
| 6,200,253 B1 | * | 3/2001 | Nishiumi et al. | ............. 463/47 |

FOREIGN PATENT DOCUMENTS

| | | |
|---|---|---|
| JP | 9-164270 | 0/1997 |
| JP | 10-277264 | 0/1998 |
| JP | 2000-343034 | 0/2000 |

OTHER PUBLICATIONS

Japanese Office Action Issued on Aug. 16, 2007 with English translation.

* cited by examiner

*Primary Examiner*—John M. Hotaling, II
(74) *Attorney, Agent, or Firm*—Whitham Curtis Christofferson & Cook, PC

(57) ABSTRACT

A controller includes a case body, a vibration motor for vibrating the case body, a slide switch operated by a side button disposed on a side face of the case body, a contact board of the slide switch and a wiring board, including a holder holding the vibration motor and the contact board. The slide switch and the holder is provided on a first face of the wiring board.

7 Claims, 3 Drawing Sheets

GAME CONTROLLER WITH VIBRATION MOTOR

BACKGROUND OF THE INVENTION

This invention relates to a controller and, more particularly, to a controller for use in a game, which has a vibration motor for generating vibrations, and a side button, such as a trigger button, provided on a case side.

Such a kind of a related controller is described hereinbelow with reference to FIGS. 3 and 4. In FIG. 3, key holes 2, to which a plurality of key switches for performing various kinds of operations are attached, are formed in an upper case 1 of the connector. The upper case 1 is fitted into a lower case 3 to thereby compose the controller case.

In FIG. 4, wires of the controller are printed on the top and bottom faces of a wiring board 4 to be accommodated in the upper case 1. Further, slide switches 5 to be operated by side keys, such as trigger switches 5, provided on a side face of the case are disposed on the bottom face of the wiring board 4. Moreover, a connector 6 for connecting wires provided on the wiring board 4 to external wires is provided on the bottom face of the wiring board 4.

Further, in FIG. 4, a vibration motor 8 is disposed in a front portion of a central part of a wiring board 7 to be accommodated in the lower case 3 by being fixed to the lower case 3. Incidentally, another related controller having a configuration, in which the vibration motor 8 is fixed to the wiring board 7 by a holding member, has been known.

Furthermore, contact boards 9 of the side keys are respectively disposed on the left side and the right side of this vibration motor 8 by being held by the lower case 3 in such a way as to extend perpendicularly.

Thus, a wire extended from the vibration motor 8, and a wire extended from one of the contact boards 9 are connected to a wiring pattern printed on the top face of the wiring board 7. Further, a cable terminal 11 of a connecting cable 10 is connected to the bottom face of the wiring board 7. A connector 12 is connected to the other end of the connecting cable 10. The connector 12 is connected to the connector 6 provided on the wiring board 4.

In the controller, wiring boards 4 and 7 are respectively accommodated in the upper case 1 and the lower case 3. The wire extended from the vibration motor 8, and the wire on the contact board 9 of the side key are connected to the wiring board 7 accommodated in the lower case 3 the wiring board 7 of the lower case 3 is connected to the wiring board 4 accommodated in the upper case 1 through the connecting cable 10.

However, in the case of the controller, because the wiring boards 4 and 7 are accommodated in the upper case 1 and the lower case 3, respectively, the configuration of the controller becomes complex. Moreover, because the connecting cable 110 is used for connecting the wiring boards 4 and 7 to each other, this connecting cable 10 impedes assembling operations.

Furthermore, this connecting cable 10 cannot be elongated due to structural causes. Thus, the connecting cable 10 is set to be as short as possible. When such a short cable is used, it is extremely difficult to connect a connector thereto. Thus, the related controller has a problem that this makes it difficult to perform an assembling operation thereof.

SUMMARY OF THE INVENTION

It is therefore an object of the present invention to provide a controller, in which the configuration of the controller is simple and facilitates the assembling operation of the connector.

In order to achieve the above object, according to the present invention, there is provided a controller comprising:
a case body;
a vibration motor for vibrating the case body;
a slide switch operated by a side button disposed on a side face of the case body;
a contact board of the slide switch; and
a wiring board, including a holder holding the vibration motor and the contact board;
wherein the slide switch and the holder is provided on a first face of the wiring board.

In this configuration, the vibration motor and the contact board are held by the wiring board through the holder, and can be connected directly to a wiring pattern provided on the wiring board. Consequently, there is no need for using the connecting cable and the connector as provided in the related controller. Thus, the controller can be simplified. Moreover, the assembling thereof can be facilitated.

Further, the necessity for the connecting cable, which connects between the upper case and the lower case, is eliminated. Moreover, the invention eliminates the need for connecting the connecting cable to the wire when the upper case and the lower case are fitted to each other. Consequently, the assembling of the controller is easily achieved.

Preferably, the holder includes a motor holding portion which holds the vibration motor and a contact board holding portion which holds the contact board; and
wherein the motor holding portion is formed so as to protrude from the wiring board in a direction perpendicular to an extending direction of the wiring board.

Preferably, the motor holding portion has a protruding portion protruded in a direction parallel with the extending direction of the wiring board, and the protruding portion located away from the wiring board; and
wherein a space is formed between the wiring board and the protruding portion for accommodating a part of a cable connected to the wiring board.

In this configuration, a part of the cable to be connected to the wiring board can be loosely fitted into and accommodated in between the protruding portion and the wiring board. Further, even when the cable is externally pushed thereinto, the protruding portion restrains the cable from being pushed thereinto. Moreover, the cable can be prevented from being entangled and twisted in the case.

Here, it is preferable that the controller further comprises a wiring locking portion provided on the wiring board, the wiring locking portion located at a vicinity of the motor holding portion; and
wherein the wire locking portion locks a wire connecting the vibration motor to the wiring board.

In this configuration, the wire connecting this vibration motor to the wiring board can be locked by the wire locking portion. Thus, the wire can be prevented from being entangled and twisted.

Here, it is preferable that the wire locking portion is a hook member.

In this configuration, the wire can reliably locked by the hook-like wire locking portion.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
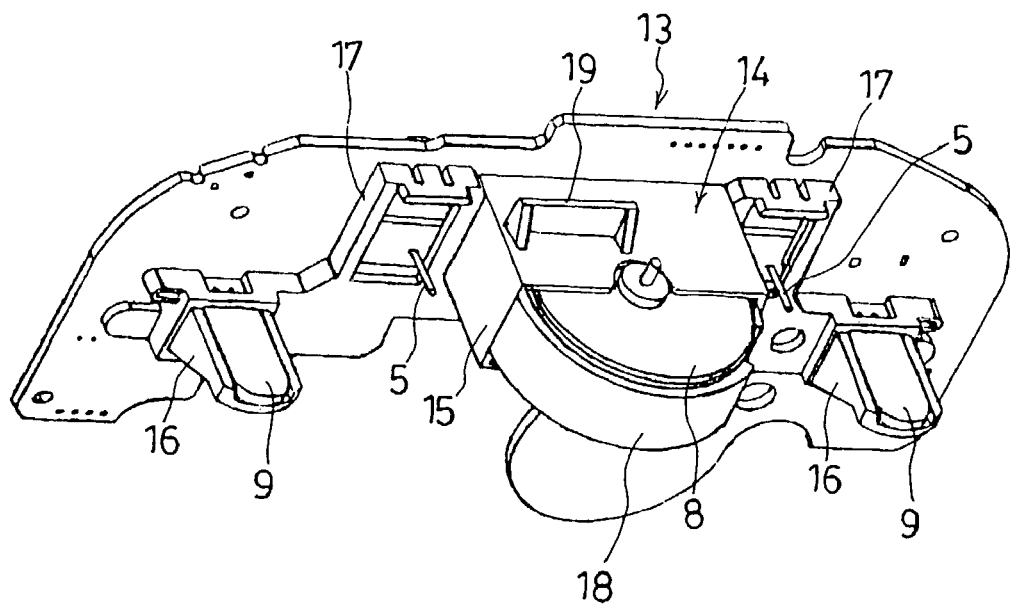
FIG. 1 is a perspective view illustrating an embodiment of the invention, which is taken from a leftward and downward direction of a wiring board of a controller.

An embodiment of the invention is described in detail with reference to FIGS. 1 and 2. Incidentally, for convenience of description, each of constituent parts thereof, which is the same as the corresponding part of the related controller, is designated by the same reference numerals used for denoting the latter part of the related controller. Further, the description of such constituent parts are omitted. Moreover, the state illustrated in FIG. 3 used for describing the related controller is also common to the embodiment of the invention. Thus, this figure is described, simultaneously with the description of FIGS. 1 and 2.

Figure 3:
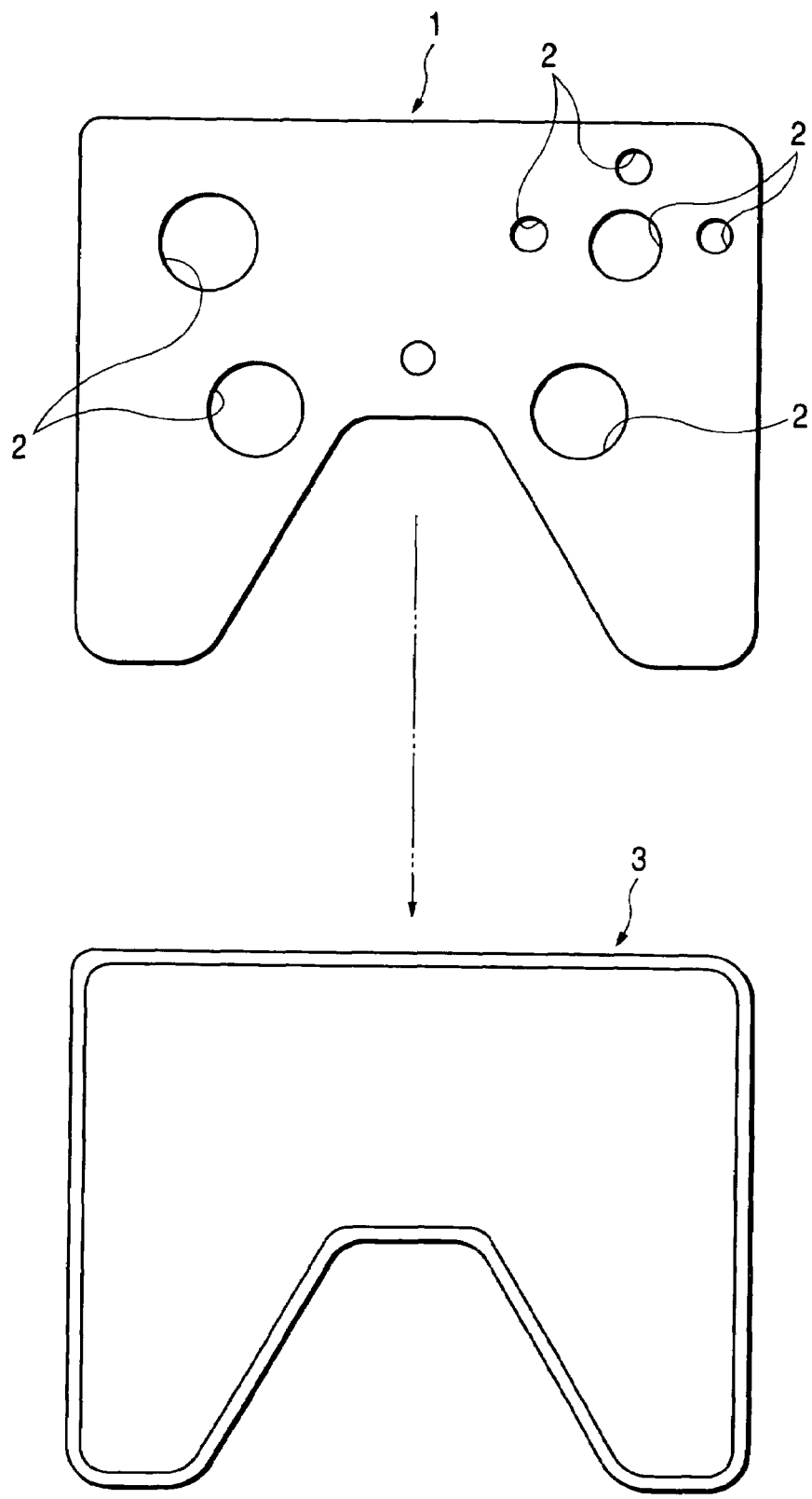
FIG. 3 is a plan view illustrating an assembled state of a controller case of a related controller.
Figure 4:
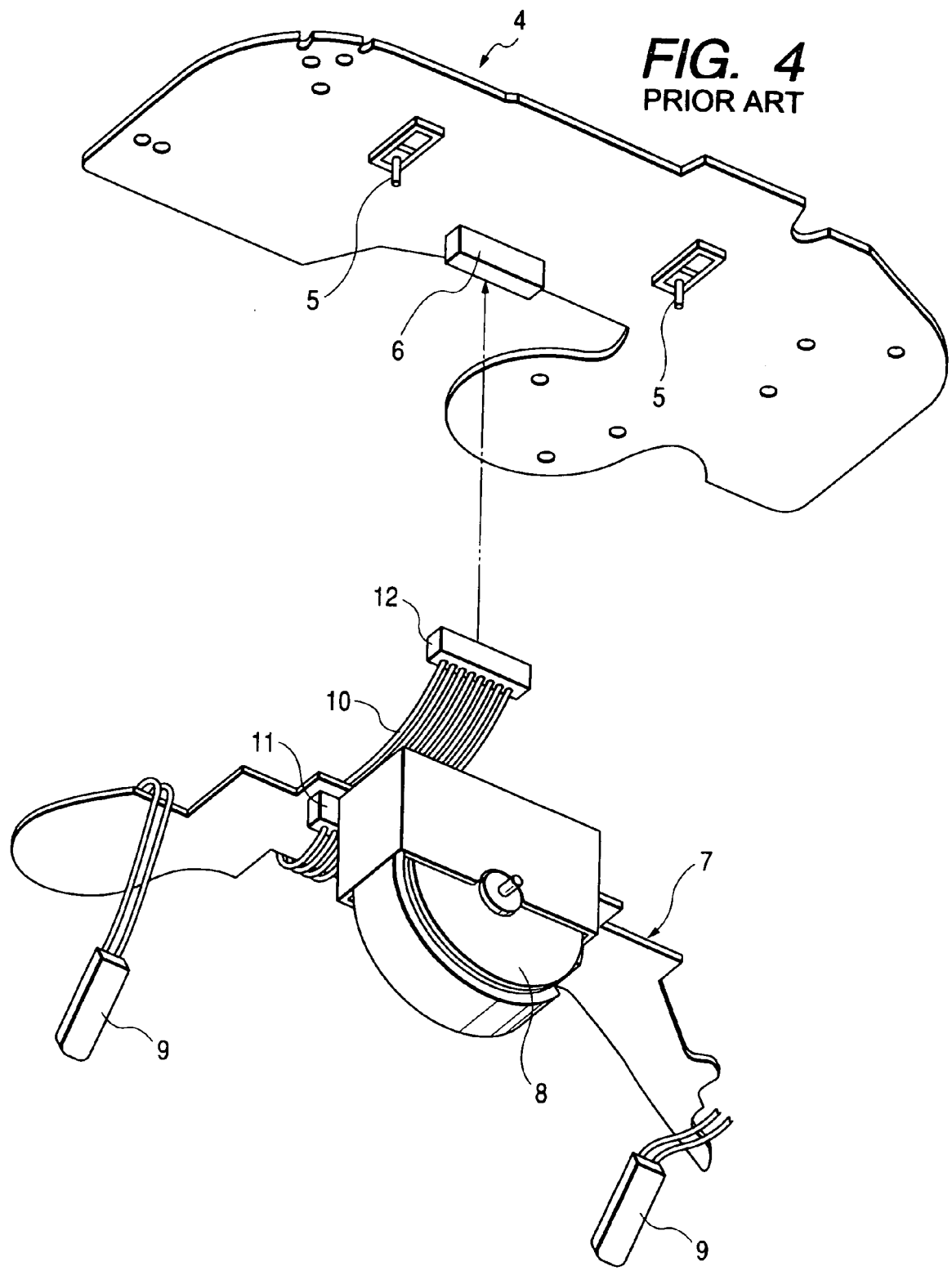
FIG. 4 is a perspective view illustrating a wiring board of the related controller.

In FIGS. 1 and 3, a holder 14 for holding a vibration motor 8 and contact boards 9 for a side button is provided on the bottom face of a wiring board 13 to be accommodated in an upper case 1

A vibration motor holding portion 15 for press-holding an upper half portion of the vibration motor 8 is provided in this holder 14 in such a way as to extend in a protruding direction in which the portion 15 protrudes from the wiring board 13. Contact board holding portions 16 for holding the contact boards 9 in a perpendicular direction are disposed on the lateral sides of this vibration motor holding portion 15 in such a manner as to extend in a protruding direction in which the holding portions 16 protrudes from the wiring board 13, similarly as the vibration motor holding portion 15. Furthermore, each of slide switch holding portions 17 for holding a corresponding one of slide switches 5 are respectively provided nearly at a middle portion between the vibration holding portion 15 and a corresponding one of the contact board holding portions 16.

Thus, the controller is configured so that most of wiring boards are accommodated in the upper case 1, that other wiring boards are accommodated in this upper case 1, and that no wiring boards are accommodated in the lower case 3.

Incidentally, rubber 18 is wound around the outer periphery of the vibration motor 8. This vibration motor 8 is held by the holder 14 through the rubber 18. Moreover, a lower portion of the vibration motor 8 is supported by the lower case 3 so as to come into contact therewith. Further, the vibration of the vibration motor 8 is transmitted to the lower case 3 through the rubber 18.

Thus, the vibration motor 8 and the contact board 9 can be wire-connected directly to the wiring pattern provided on the wiring board 13. Therefore, there is no need for using the connecting cable and the connector, which are used in the related controller. Consequently, the configuration of the controller is simplified. Moreover, the assembling thereof is facilitated. Thus, the invention can contribute to reduced cost.

Further, the wiring board 13 is accommodated in the upper case 1. No wiring board is accommodated in the lower case 3. Thus, even in the case that the vibration motor 8 and the bottom portions of the contact boards 9 are provided in such a way as to protrude to the lower case 3, the vibration motor 8 and the bottom portions of the contact boards 9 do not touch an obstacle when the upper case 1 is fitted into the lower case 3. Further, a cable for connecting between the upper case and the lower case is not used. This eliminates the necessity for connecting the wire to the connector.

Figure 2:
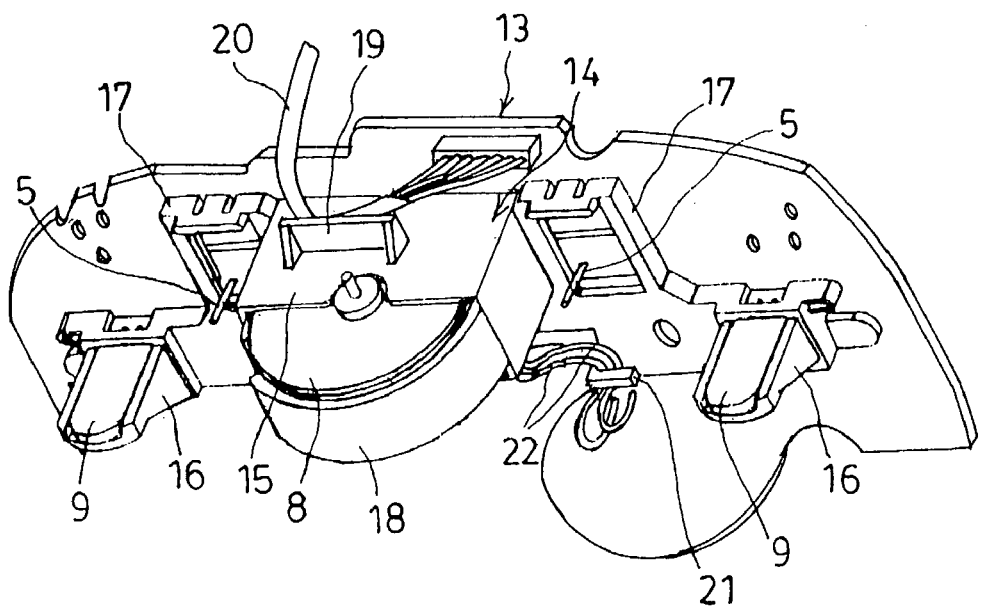
FIG. 2 is a perspective view illustrating the embodiment of the invention, which is taken from a rightward and downward direction of the wiring board of the controller.

Furthermore, as shown in FIG. 2, a protruding portion 19 is provided at a predetermined place on the vibration motor holding portion 15 of the holder 14 in such a way as to be located at a predetermined distance from and in parallel to the wiring board 13. This protruding portion 19 is configured so that a part of a cable 20 to be connected to the wiring board 13 is accommodated between the protruding portion 19 and the wiring board 13 by being loosely fitted thereinto. Thus, even when this cable 20 is externally pushed into the controller, the cable 20 can be restrained by the protruding portion 19 from being pushed thereinto. Moreover, the cable 20 can be prevented by the protruding portion 19 from being entangled and twisted in the case.

Further, in FIG. 2, a wire locking portion 21 is provided in the vicinity of the vibration motor holding portion 15 of the holder 14, and is formed like a hook. A wire 22 connecting the vibration motor 8 to the wiring board 13 is reliably locked by the wire locking portion 21. Thus, the wire 22 is prevented from being entangled and twisted.

Incidentally, various modifications may be made without departing from the spirit of the invention. Further, the invention covers such modifications as a matter of course.

What is claimed is:

1. A controller comprising:
   a case body;
   a vibration motor for vibrating the case body;
   a slide switch operated by a side button disposed on a side face of the case body;
   a contact board of the slide switch; and
   a wiring board, including a holder holding the vibration motor and the contact board;
   wherein the slide switch and the holder are provided on a first face of the wiring board.

2. The controller as set forth in claim 1, wherein the holder includes a motor holding portion which holds the vibration motor and a contact board holding portion which holds the contact board; and
   wherein the motor holding portion is formed so as to protrude from the wiring board in a direction perpendicular to an extending direction of the wiring board.

3. The controller as set forth in claim 2, wherein the motor holding portion has a protruding portion protruded in a direction parallel with the extending direction of the wiring board, and the protruding portion is located away from the wiring board; and
   wherein a space is formed between the wiring board and the protruding portion for accommodating a part of a cable connected to the wiring board.

4. The controller as set forth in claim 2, further comprising a wiring locking portion provided on the wiring board, the wiring locking portion located at a vicinity of the motor holding portion; and
   wherein the wire locking portion locks a wire connecting the vibration motor to the wiring board.

5. The controller as set forth in claim 4, wherein the wire locking portion is a hook member.

6. The controller as set forth in claim 1, wherein the case body includes an upper case and a lower case; and
   wherein the wiring board is accommodated in the upper case of the case body.

7. The controller as set forth in claim 6, wherein a lower portion of the vibration motor contacts on the lower case.

* * * * *